US012330309B2

(12) United States Patent
Zhou et al.

(10) Patent No.: US 12,330,309 B2
(45) Date of Patent: Jun. 17, 2025

(54) ROBOT MOTION CONTROL METHOD AND APPARATUS

(71) Applicant: Tencent Technology (Shenzhen) Company Limited, Guangdong (CN)

(72) Inventors: Qinqin Zhou, Guangdong (CN); Xiangyu Chen, Guangdong (CN); Yu Zheng, Guangdong (CN); Liangwei Xu, Guangdong (CN); Sicheng Yang, Guangdong (CN); Kun Xiong, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 189 days.

(21) Appl. No.: 17/983,553

(22) Filed: Nov. 9, 2022

(65) Prior Publication Data

US 2023/0069572 A1 Mar. 2, 2023

Related U.S. Application Data

(63) Continuation of application No. PCT/CN2022/073356, filed on Jan. 24, 2022.

(30) Foreign Application Priority Data

Jan. 28, 2021 (CN) .......................... 202110116500.1

(51) Int. Cl.
*B25J 9/16* (2006.01)
*B25J 9/06* (2006.01)
*B25J 11/00* (2006.01)

(52) U.S. Cl.
CPC ........... *B25J 9/1664* (2013.01); *B25J 9/1607* (2013.01); *B25J 11/008* (2013.01); *B25J 9/06* (2013.01)

(58) Field of Classification Search
CPC ...... B25J 9/1664; B25J 9/1607; B25J 11/008; B25J 9/06
See application file for complete search history.

(56) References Cited

U.S. PATENT DOCUMENTS

2004/0128028 A1 7/2004 Miyamoto et al.
2015/0367518 A1* 12/2015 Oh .................. B25J 9/1674
700/256

(Continued)

FOREIGN PATENT DOCUMENTS

CN 108237532 A 7/2018
CN 108345211 7/2018

(Continued)

OTHER PUBLICATIONS

International Search Report issued Apr. 19, 2022 in International (PCT) Application No. PCT/CN2022/073356.

(Continued)

*Primary Examiner* — Thomas E Worden
*Assistant Examiner* — Jay Khandpur
(74) *Attorney, Agent, or Firm* — Crowell & Moring LLP

(57) ABSTRACT

This disclosure is related to a robot motion control method and apparatus. The method includes: obtaining a center-of-mass reference trajectory used for guiding the robot to execute a target motion; obtaining, based on optimization of an objective function, center-of-mass control information for controlling the robot to follow the center-of-mass reference trajectory to move; generating joint control information according to the center-of-mass control information and a structure matrix of the robot; and controlling the robot to execute the target motion based on the joint control information.

17 Claims, 4 Drawing Sheets (a) Hold an item (b) Open a door

(56) References Cited

U.S. PATENT DOCUMENTS

| | | | |
|---|---|---|---|
| 2016/0185405 A1 | 6/2016 | Takanishi et al. | |
| 2016/0236349 A1* | 8/2016 | Yamane | B25J 9/1664 |
| 2018/0107175 A1* | 4/2018 | Ha | G05B 11/01 |
| 2020/0369333 A1* | 11/2020 | Lavalley | B25J 11/0035 |
| 2021/0178587 A1* | 6/2021 | Chen | B62D 57/032 |
| 2022/0184802 A1* | 6/2022 | Rinke | B25J 9/1669 |

FOREIGN PATENT DOCUMENTS

| | | | | |
|---|---|---|---|---|
| CN | 108469732 A | | 8/2018 | |
| CN | 106886155 B | | 1/2020 | |
| CN | 111367327 | | 7/2020 | |
| CN | 111367327 A | | 7/2020 | |
| CN | 111674486 A | * | 9/2020 | B25J 9/161 |
| CN | 112207825 A | | 1/2021 | |
| CN | 111674486 | | 8/2021 | |
| CN | 112207825 | | 2/2022 | |
| CN | 111872941 A | | 7/2022 | |
| JP | 2016-120584 | | 7/2016 | |
| JP | 2016120584 A | | 7/2016 | |
| WO | 2007/139135 | | 12/2007 | |
| WO | WO 2007139135 A1 | | 12/2007 | |

OTHER PUBLICATIONS

Office Action issued on Japanese application No. JP-2023-528179 on Mar. 18, 2024 and English translation appended; 8 pages
Extended European Search Report in European application No. 22745172.1, dated May 2, 2024, 10 pages.
Office Action issued Mar. 12, 2024 in related Japanese Application No. 2023-528179.
Office action issued in Chinese application No. 202110116500.1, dated Aug. 27, 2024, 15 pages (with English translation).
Office action issued in Chinese application No. 202110116500.1, dated Dec. 12, 2024, 18 pages (with English translation).

* cited by examiner

ROBOT MOTION CONTROL METHOD AND APPARATUS

RELATED APPLICATION

This application is a continuation application of PCT Patent Application No. PCT/CN2022/073356, filed on Jan. 24, 2022, which claims priority to Chinese Patent Application No. 202110116500.1, entitled "ROBOT MOTION CONTROL METHOD AND APPARATUS, ROBOT, AND STORAGE MEDIUM" and filed with the China National Intellectual Property Administration on Jan. 28, 2021, wherein the content of each of the above-referenced applications is incorporated herein by reference in its entirety.

FIELD OF THE TECHNOLOGY

Embodiments of this disclosure relate to the field of robot control technologies of artificial intelligence technologies, and in particular, to a robot motion control method and apparatus, a robot, a storage medium, and a computer program product.

BACKGROUND OF THE DISCLOSURE

With the development of the artificial intelligence technologies, some organizations and scientific research institutions have launched a number of robots that can realize automatic walking, such as biped robots and quadruped robots.

Taking the quadruped robots as an example, current research on the quadruped robots mostly focuses on design of body structures, and relatively little research has been done on motion control, which leads to a problem that the current quadruped robots are basically only capable of crawling on four legs.

SUMMARY

Embodiments of this disclosure provide a robot motion control method and apparatus, a robot, a storage medium, and a computer program product. The technical solutions are as follows:

A robot motion control method, the method including:
  obtaining a center-of-mass reference trajectory used for guiding the robot to execute a target motion; the center-of-mass reference trajectory being a center-of-mass motion trajectory of the robot configured to achieve the target motion;
  obtaining, based on optimization of an objective function, center-of-mass control information for controlling the robot to follow the center-of-mass reference trajectory to move;
  generating joint control information according to the center-of-mass control information and a structure matrix of the robot; and
  controlling the robot to execute the target motion based on the joint control information.

A robot motion control apparatus, the apparatus including a memory operable to store computer-readable instructions, and a processor circuitry operable to read the computer-readable instructions. When executing the computer-readable instructions, the processor circuitry is configured to:
  obtain a center-of-mass reference trajectory for guiding the robot to execute a target motion; the center-of-mass reference trajectory being a center-of-mass motion trajectory of the robot configured to achieve the target motion;
  obtain, based on optimization of an objective function, center-of-mass control information for controlling the robot to follow the center-of-mass reference trajectory to move;
  generate joint control information according to the center-of-mass control information and a structure matrix of the robot; and
  control the robot to execute the target motion based on the joint control information.

A robot, including a memory and one or more processors, where the memory stores a computer-readable instruction, and when the computer-readable instruction is executed by the one or more processors, the one or more processors are caused to perform the steps of the robot motion control method.

A non-transitory machine-readable media storing instructions is provided. When being executed, the instructions are configured to cause a machine to:
  obtain a center-of-mass reference trajectory for guiding the robot to execute a target motion; the center-of-mass reference trajectory being a center-of-mass motion trajectory of the robot configured to achieve the target motion;
  obtain, based on optimization of an objective function, center-of-mass control information for controlling the robot to follow the center-of-mass reference trajectory to move;
  generate joint control information according to the center-of-mass control information and a structure matrix of the robot; and
  control the robot to execute the target motion based on the joint control information.

A computer program product or computer program is provided, including computer-readable instructions, the computer-readable instructions being stored in a computer-readable storage medium. A processor of a computer device reads the computer-readable instructions from the computer-readable storage medium, and executes the computer-readable instructions, to cause the computer device to perform the steps of the robot motion control method.

Details of one or more embodiments of this disclosure are provided in the accompany drawings and descriptions below. Other features, objectives, and advantages of this disclosure become obvious with reference to the specification, the accompanying drawings, and the claims.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

To make objectives, technical solutions, and advantages of this disclosure clearer, the following further describes in detail implementations of this disclosure with reference to the accompanying drawings.

Artificial intelligence (AI) technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. AI software technologies mainly include fields such as a computer vision technology, a speech processing technology, a natural language processing technology, machine learning/deep learning, and the like.

The technical solutions of this disclosure mainly relate to a robot technology in the artificial intelligence technology, and mainly to intelligent robotic control. A robot is a mechanical-electronic device that can imitate a certain skill of humans by combining mechanical transmission and a modern microelectronics technology. The robot is developed on the basis of electronics, machinery, and information technologies. The robot does not have to look like a human, which is a member of a robot family as long as the robot can complete tasks and commands given by humans. The robot is an automatic machine. This machine has some intelligent capabilities similar to those of humans or living things, such as a perception capability, a planning capability, a movement capability, and a cooperation capability, which is a highly flexible automatic machine. With the development of computer and artificial intelligence technologies, the robot has been greatly improved in function and technology levels, which is typically represented by mobile robots and robot vision and touch technologies.

A robot motion control method according to embodiments of this disclosure enables the robot to move according to a center-of-mass reference trajectory, so as to complete a certain target motion. For example, the target motion may be a motion process from a four-legged lying down state to a two-legged standing state, a motion process from a two-legged standing state to a jumping and flying state, or the like.

Specifically, in the robot motion control method according to the embodiments of this disclosure, the robot is simplified as a particle model, a center-of-mass reference trajectory used for guiding the robot to execute the target motion is obtained, then center-of-mass control information for controlling the robot to follow the center-of-mass reference trajectory to move is obtained based on optimization of an objective function, joint control information is generated accordingly, and then the robot is controlled based on the joint control information to execute the target motion. For a motion scenario with a given reference trajectory, by using the technical solution according to the embodiments of this disclosure, accurate and effective control can be realized, so that the robot can complete the target motion as expected, enriching the robot's motion capability.

Direct calculation of the control information used for guiding the robot to execute the target motion such as force and torque requires accurate kinetics parameters of the robot and stable ground friction conditions, so the processing method is sensitive to an environment and has poor robustness. Upon comparison, in this disclosure, firstly, a center-of-mass reference trajectory determined offline is obtained, then a controller is constructed to realize online following of the center-of-mass reference trajectory, and an actual center-of-mass motion trajectory is continuously fitted to the center-of-mass reference trajectory, so that a given target motion can be executed without a need to obtain accurate kinetics parameters and stable ground friction conditions. The whole solution has low sensitivity to the environment and has high robustness, effectively improving stability of controlling the robot to execute the target motion.

In an example, the robot is a leg-wheel hybrid quadruped robot. The so-called leg-wheel hybrid quadruped robot refers to a quadruped robot with 2 front legs and 2 rear legs. Moreover, wheels are mounted on legs of the quadruped robot, so that the quadruped robot can walk on four legs as well as move on wheels. The above wheels may be mounted only on the rear legs of the quadruped robot or only on the front legs of the quadruped robot, and the corresponding wheels may also be mounted on both the front legs and the rear legs of the quadruped robot.

Figure 1:
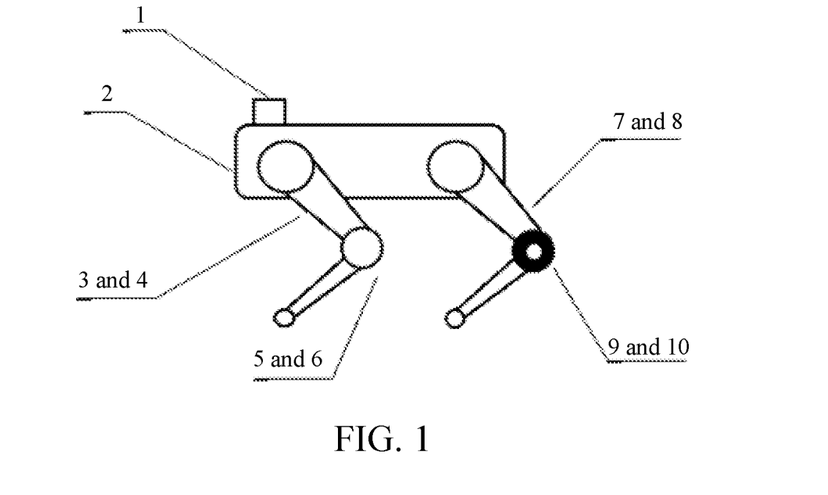
FIG. 1 is a schematic structural diagram of a leg-wheel hybrid quadruped robot according to this disclosure.

FIG. 1 exemplarily shows a schematic structural diagram of a leg-wheel hybrid quadruped robot. The leg-wheel hybrid quadruped robot may include: a camera 1, a body 2, three-degree-of-freedom front legs 3 and 4 (left and right), front wheels 5 and 6 (active or passive, left and right), three-degree-of-freedom rear legs 7 and 8 (left and right), and rear wheels 9 and 10 (active, left and right). The camera 1 has an image collection function. For example, an ambient image is collected, so that the ambient image is analyzed to program an appropriate walking route for the robot. In a four-legged lying down state, the leg-wheel hybrid quadruped robot may use the three-degree-of-freedom front legs 3 and 4 (left and right) and the three-degree-of-freedom rear legs 7 and 8 (left and right) to contact the ground, and respectively drive and control the above 4 legs through a motor to realize walking on four legs. In addition, four-wheeled sliding can be realized by controlling the front wheels 5 and 6 and the rear wheels 9 and 10 to be grounded and other parts to get off the ground. Alternatively, two-wheeled sliding can be realized by controlling the rear wheels 9 and 10 to be grounded and other parts to get off the ground.

Figure 2:
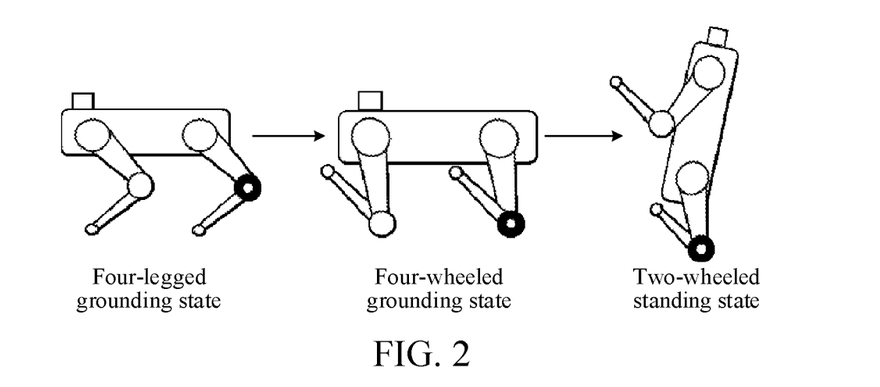
FIG. 2 is a schematic diagram of a leg-wheel hybrid quadruped robot changing into a two-wheeled standing state according to this disclosure.

For example, as shown in FIG. 2, the leg-wheel hybrid quadruped robot may change from a four-legged grounding state to a four-wheeled grounding state, and then from the four-wheeled grounding state to a two-wheeled standing state. The quadruped robot in the two-wheeled standing state can move at a high speed on wheels, which, compared with legged motion of a conventional quadruped robot, improves motion efficiency and is more suitable for structured scenarios, such as residential communities and industrial parks.

Figure 3:
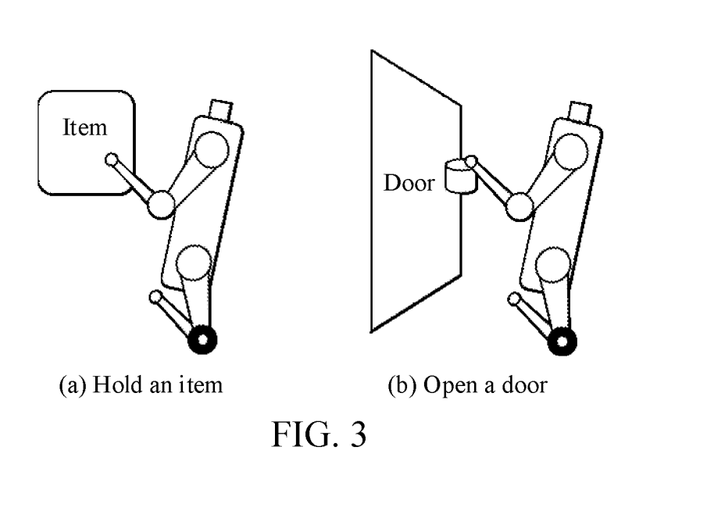
FIG. 3 is a schematic diagram of a leg-wheel hybrid quadruped robot executing an operation task in a two-wheeled standing state according to this disclosure.
Figure 4:
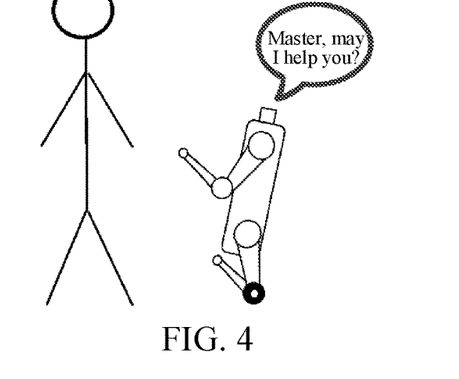
FIG. 4 is a schematic diagram of a leg-wheel hybrid quadruped robot in a two-wheeled standing state interacting with a user according to this disclosure.

As shown in FIG. 3, the quadruped robot after standing on two wheels has an increased motion space for two forelegs, which can also complete a variety of operation tasks without any additional auxiliary manipulator, such as holding an item shown in (a) of FIG. 3, or opening a door shown in (b) of FIG. 3. As shown in FIG. 4, free switching between four-legged motion and two-wheeled motion and autonomous two-wheeled standing may be used as a demonstration manner of the leg-wheel hybrid quadruped robot, which increases diversity of human-machine interaction.

Figure 5:
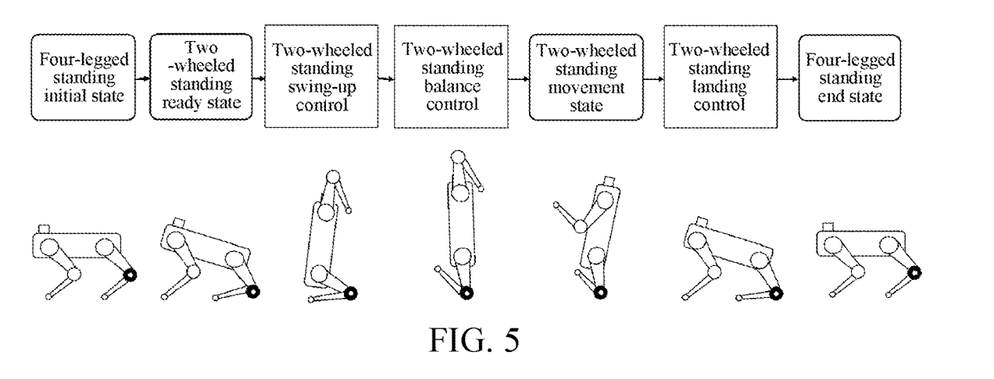
FIG. 5 is a schematic diagram of a leg-wheel hybrid quadruped robot switching between various states according to this disclosure.

When the robot according to this embodiment of this disclosure is the leg-wheel hybrid quadruped robot shown in FIG. 1, as shown in FIG. 5, the following several motion states may be included. Firstly, the leg-wheel hybrid quadruped robot is in a normal four-legged standing state. Then, through end positions at bottoms of legs, the quadruped robot is controlled to enter a two-wheeled standing ready state. That is, the body tilts at a certain angle, and bottoms of the front legs, bottoms of the rear legs, and the rear wheels contact the ground. Next, two wheels stand and swing up. Then, standing of the two wheels is balanced. Afterwards, the robot may enter a two-wheeled standing and moving state, and the front legs may swing freely. After the movement ends, the robot is restored to the four-legged standing state by two-wheeled standing and landing control.

Figure 6:
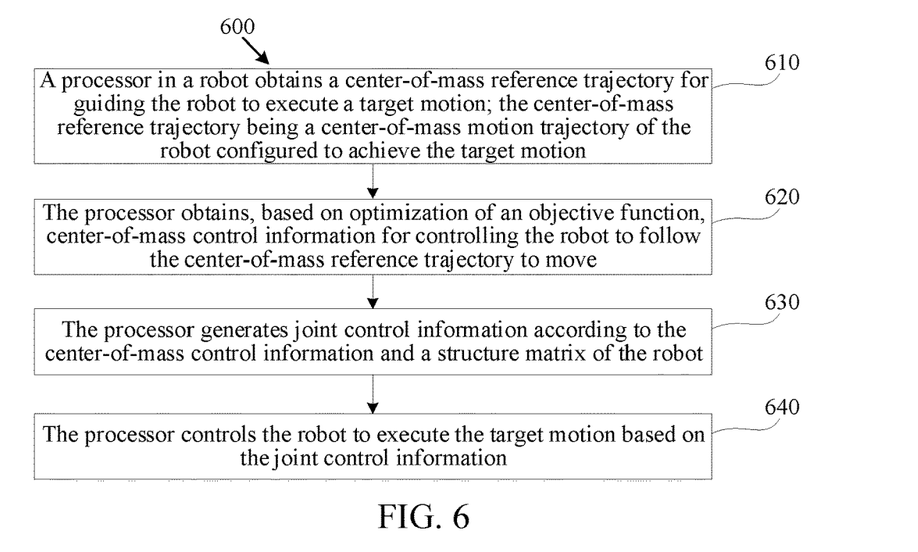
FIG. 6 is a flowchart of a robot motion control method according to an embodiment of this disclosure.

Refer to FIG. 6 which shows a flowchart of a robot motion control method 600 according to an embodiment of this disclosure. Steps of the method 600 may be performed by a robot, for example, a processor disposed in the robot. The method 600 may include the following steps (610 to 640):

Step 610: A processor in a robot obtains a center-of-mass reference trajectory used for guiding the robot to execute a target motion; the center-of-mass reference trajectory being a center-of-mass motion trajectory of the robot programmed to achieve the target motion.

A center of mass of the robot is a barycenter of the robot, that is, a hypothetical point on the robot where the mass is assumed to be concentrated.

The target motion may be any motion that changes a position of the center of mass. Taking the quadruped robot as an example, the target motion may be a motion process from a four-legged lying down state to a two-legged standing state, and the target motion may also be a motion process from a two-legged standing state to a jumping and flying state, or the like. Certainly, for different types of robots, the above target motion may further be any other motion that changes the position of the center of mass, which is not limited in the embodiments of this disclosure.

The center-of-mass reference trajectory may be generated by another device and pre-stored in a memory of the robot. The processor of the robot may obtain the center-of-mass reference trajectory from the processor when needing to use the center-of-mass reference trajectory. Certainly, in some other embodiments, the center-of-mass reference trajectory may also be generated by the processor of the robot if computing power of the processor of the robot permits. In addition, the center-of-mass reference trajectory may be premised on achieving the target motion, which is generated according to changes in the position of the center of mass of the robot in this process. An acquisition manner and a generation manner of the center-of-mass reference trajectory are not specifically limited in the embodiments of this disclosure.

Step 620: The processor obtains, based on optimization of an objective function, center-of-mass control information for controlling the robot to follow the center-of-mass reference trajectory to move.

The center-of-mass control information is control information associated with the center of mass of the robot, which is used for controlling the position of the center of mass of the robot. For example, the center-of-mass control information may include force applied to the center of mass of the robot. The force applied to the center of mass herein may be force directly applied to the center of mass or force indirectly applied to the center of mass. For example, assuming that the target motion is a motion process from a four-legged lying down state to a two-legged standing state, the center-of-mass control information may include bearing surface reaction force at contact points between the robot and a bearing surface (such as the ground). When the robot is in the four-legged lying down state, a number of the contact points between the robot and the bearing surface (such as the ground) may be 4, with one contact point between each leg bottom and the bearing surface (such as the ground). The bearing surface reaction force refers to a reaction force applied by the bearing surface where the robot is located to the robot. When the robot applies force to the bearing surface, the bearing surface may provide reaction force for the robot. When the robot is on the ground, the above bearing surface reaction force may also be called ground reaction force. The above bearing surface reaction force at the contact points may be considered as force indirectly applied to the center of mass.

In other examples, when the robot is a biped robot or a quadruped robot and the target motion changes from a two-legged/four-legged standing state to a jumping and flying state, the center-of-mass control information may also include the bearing surface reaction force at the contact points between the robot and the bearing surface (such as the ground). In another example, when the robot is a two-wheeled robot or a four-wheeled robot and the target motion is a wheeled motion, the center-of-mass control information may include thrust used for controlling motion of the robot. The types of the robot, the forms of the target motion, and the content of the corresponding center-of-mass control information introduced above are exemplary and explanatory. A person skilled in the art can make flexible design in practical applications on the basis of the content disclosed in this disclosure.

The objective function is an optimization function set for the robot to follow the center-of-mass reference trajectory to move. Different values of the objective function may be calculated when different center-of-mass control information is selected. Assuming that the robot can follow the center-of-mass reference trajectory to move based on an optimization objective of minimizing the value of the objective function, when a set of center-of-mass control information that minimizes the value of the objective function exists, the set of center-of-mass control information is the center-of-mass control information used for controlling the robot to follow the center-of-mass reference trajectory to move and obtained by optimization. Assuming that the robot can follow the center-of-mass reference trajectory to move based on an optimization objective of maximizing the value of the objective function, when a set of center-of-mass control information that maximizes the value of the objective function exists, the set of center-of-mass control information is the center-of-mass control information used for controlling the robot to follow the center-of-mass reference trajectory to move and obtained by optimization.

Step 630: The processor generates joint control information according to the center-of-mass control information and a structure matrix of the robot.

The structure matrix of the robot is a mathematical representation of a structure of the robot, which is used for representing structural features of the robot. In some embodiments, the structure matrix of the robot is used for representing a joint structure of the robot. For example, a joint Jacobian matrix may be used as the structure matrix of the robot.

The robot may include a plurality of joints. Each joint is configured to connect two different parts of the robot, so as to apply torque to the joint to enable a relative position relationship between the two parts connected by the joint to be changed. For example, in the leg-wheel hybrid quadruped robot shown in FIG. 1, the three-degree-of-freedom rear leg is divided into two parts, the first part and the second part are connected by a rear wheel, and the rear wheel may be regarded as a joint between the first part and the second part of the rear leg, which can change a relative position relationship between the first part and the second part of the rear leg. In another example, a relative position relationship between the three-degree-of-freedom rear leg and the body can also be changed. Therefore, the three-degree-of-freedom rear leg and the body may also be connected by a corresponding joint.

The joint control information is control information associated with joints of the robot, which is used for controlling motion of the joints of the robot. In some embodiments, the joint control information may include torque applied to the joints of the robot.

Step 640: The processor controls the robot to execute the target motion based on the joint control information.

After the joint control information is obtained, the joints of the robot are controlled respectively based on the joint control information. For example, corresponding torque is applied to the joints respectively to cause the joints to move, and finally the robot is controlled to execute the target motion.

Based on the above, in the technical solution according to this embodiment of this disclosure, the robot is simplified as a particle model, the center-of-mass reference trajectory used for guiding the robot to execute the target motion is obtained, then the center-of-mass control information used for controlling the robot to follow the center-of-mass reference trajectory to move is obtained based on optimization of the objective function, the joint control information is generated accordingly, and then the robot is controlled based on the joint control information to execute the target motion. For a motion scenario with a given reference trajectory, by using the technical solution according to this embodiment of this disclosure, accurate and effective control can be realized, so that the robot can complete the target motion as expected, enriching the robot's motion capability.

In addition, direct calculation of the control information used for guiding the robot to execute the target motion such as force and torque requires accurate kinetics parameters of the robot and stable ground friction conditions, so the processing method is sensitive to an environment and has poor robustness. Upon comparison, in this disclosure, firstly, a center-of-mass reference trajectory determined offline is obtained, then a controller is constructed to realize online following of the center-of-mass reference trajectory, and an actual center-of-mass motion trajectory is continuously fitted to the center-of-mass reference trajectory, so that a given target motion can be executed without a need to obtain accurate kinetics parameters and stable ground friction conditions. The whole solution has low sensitivity to the environment and has high robustness, effectively improving stability of controlling the robot to execute the target motion.

For the leg-wheel hybrid quadruped robot, by using the technical solution according to this embodiment of this disclosure, the robot can be controlled to stand and swing up on two wheels, so that the leg-wheel hybrid quadruped robot can autonomously switch between four-legged crawling movement and two-wheeled standing movement, so as to take into account high-speed and efficient features of the wheeled motion and flexible obstacle-crossing characteristics of the legged motion. At the same time, in the two-wheeled standing movement state, the front legs are freed, and a variety of operation tasks can be completed without any additional auxiliary manipulator, which improves practicability of the leg-wheel hybrid quadruped robot.

Figure 7:
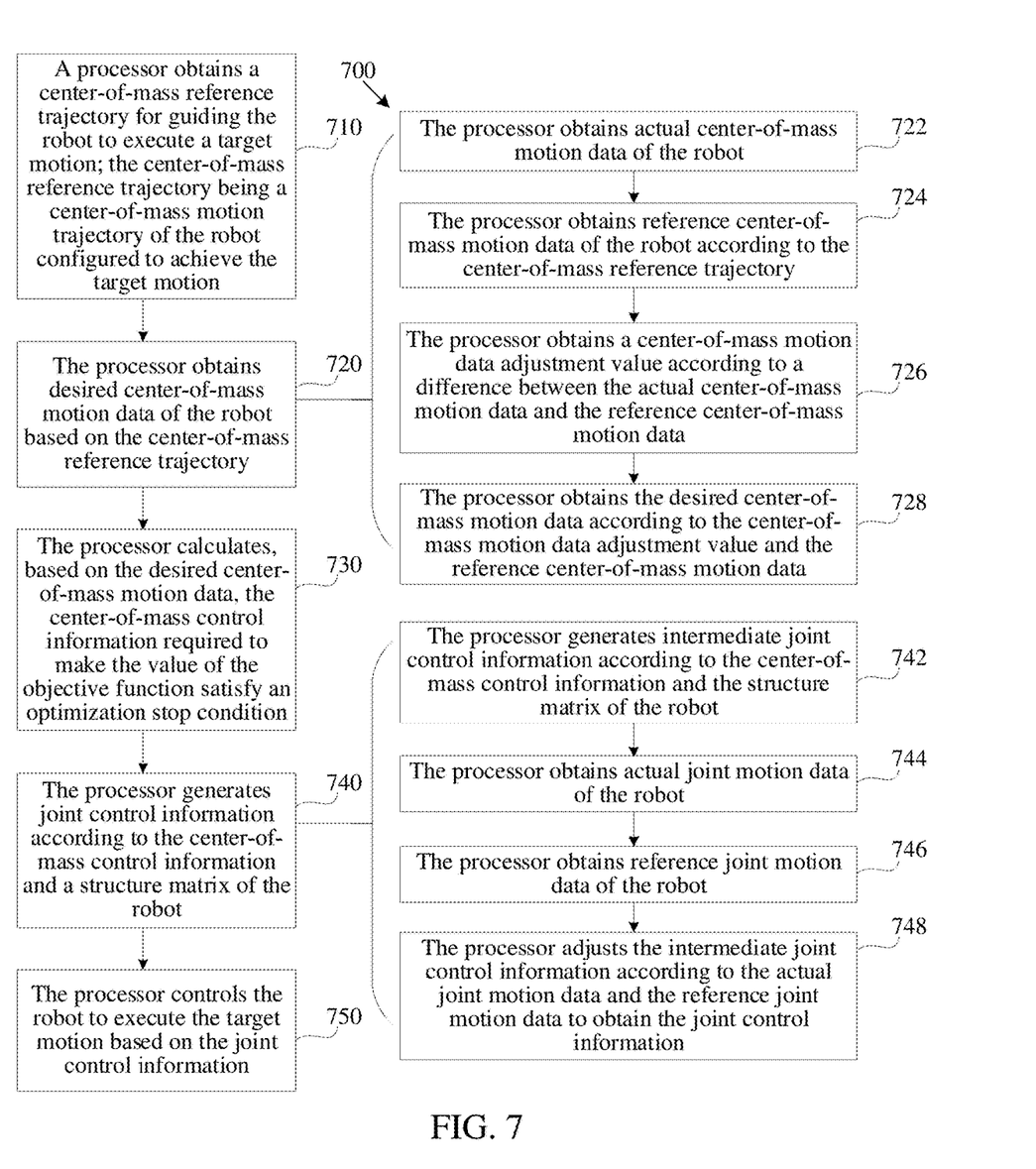
FIG. 7 is a flowchart of a robot motion control method according to another embodiment of this disclosure.

Refer to FIG. 7 which shows a flowchart of a robot motion control method 700 according to another embodiment of this disclosure. Steps of the method 700 may be performed by a robot, for example, a processor disposed in the robot. The method 700 may include the following steps (710 to 750):

Step 710: A processor obtains a center-of-mass reference trajectory used for guiding the robot to execute a target motion; the center-of-mass reference trajectory being a center-of-mass motion trajectory of the robot programmed to achieve the target motion.

In this embodiment, introduction is mainly based on a situation where the robot is a quadruped robot and the target motion is a motion process from a four-legged lying down state to a two-legged standing state. Specific implementations of the target motion in other forms are similar to this.

Step 720: The processor obtains desired center-of-mass motion data of the robot based on the center-of-mass reference trajectory.

The desired center-of-mass motion data is a desired value of motion data associated with a center of mass of the robot. The desired value may be obtained by combining actual center-of-mass motion data and reference center-of-mass motion data. The actual center-of-mass motion data is actual values of the motion data associated with the center of mass of the robot. The reference center-of-mass motion data is reference values of the motion data associated with the center of mass of the robot. The actual center-of-mass motion data may be obtained by measuring actual motion of the robot through a sensor or by other means. The reference center-of-mass motion data may be correspondingly calculated according to the center-of-mass reference trajectory. By calculating the desired center-of-mass motion data, the robot can be controlled to return to the center-of-mass reference trajectory when the actual center-of-mass motion data has deviated from the reference center-of-mass motion data.

Specifically, motion data included in the actual center-of-mass motion data, the reference center-of-mass motion data, and the desired center-of-mass motion data may correspond to identical or different data categories. In some embodiments, the actual center-of-mass motion data includes, but is not limited to, at least one of the following: an actual center-of-mass position, an actual center-of-mass velocity, actual center-of-mass acceleration, an actual center-of-mass angular velocity, and actual center-of-mass angular acceleration. In some embodiments, the reference center-of-mass motion data includes, but is not limited to, at least one of the following: a reference center-of-mass position, a reference center-of-mass velocity, reference center-of-mass acceleration, a reference center-of-mass angular velocity, and reference center-of-mass angular acceleration. In some embodiments, the desired center-of-mass motion data includes, but is not limited to, at least one of the following: a desired center-of-mass position, a desired center-of-mass velocity, desired center-of-mass acceleration, a desired center-of-mass angular velocity, and desired center-of-mass angular acceleration.

In some embodiments, as shown in FIG. 7, step 720 may include the following sub-steps (722 to 728):

Step 722: The processor obtains actual center-of-mass motion data of the robot.

Step 724: The processor obtains reference center-of-mass motion data of the robot according to the center-of-mass reference trajectory.

Step 722 and step 724 may be performed at the same time, step 722 may be performed before step 724, or step 722 may be performed after step 724, which is not limited in this embodiment of this disclosure.

Step 726: The processor obtains a center-of-mass motion data adjustment value according to a difference between the actual center-of-mass motion data and the reference center-of-mass motion data.

In some embodiments, the center-of-mass motion data adjustment value is used for adjusting the reference center-of-mass motion data or the actual center-of-mass motion data to obtain the desired center-of-mass motion data. For example, the reference center-of-mass motion data is adjusted through the center-of-mass motion data adjustment value to obtain the desired center-of-mass motion data. In another example, the actual center-of-mass motion data is adjusted through the center-of-mass motion data adjustment value to obtain the desired center-of-mass motion data.

In an exemplary embodiment, a difference between the actual center-of-mass motion data and the reference center-of-mass motion data is calculated to obtain the center-of-mass motion data adjustment value according to a gain matrix and the difference. For example, the center-of-mass motion data adjustment value may be determined based on the difference between the actual center-of-mass motion data and the reference center-of-mass motion data by using a proportional derivative (PD) controller. Correspondingly, the above gain matrix may be a PD gain matrix corresponding to the PD controller.

In some embodiments, the center-of-mass motion data adjustment value includes a center-of-mass acceleration adjustment value and a center-of-mass angular acceleration adjustment value. For example, the center-of-mass motion data adjustment value is obtained according to the difference between the actual center-of-mass motion data and the reference center-of-mass motion data, and the center-of-mass motion data adjustment value is obtained according to $\ddot{p}_c^{adj} = K_d^c(\dot{p}_c^{ref} + \dot{p}_c^{act}) + K_p^c(p_c^{ref} - p_c^{act})$ and $\dot{\omega}^{adj} = K_d^\omega(\omega^{ref} - \omega^{act}) + K_p^\omega(R^{ref}R^{act})^v$, where $\ddot{p}_c^{adj}$ denotes a center-of-mass acceleration adjustment value, $\dot{p}_c^{ref}$ denotes a reference center-of-mass velocity, $\dot{p}_c^{act}$ denotes an actual center-of-mass velocity, $p_c^{ref}$ denotes a reference center-of-mass position, $p_c^{act}$ denotes an actual center-of-mass position, $K_d^c$ and $K_p^c$ denote gain matrices associated with center-of-mass acceleration, $\dot{\omega}^{adj}$ denotes a center-of-mass angular acceleration adjustment value, $\omega^{ref}$ denotes a reference center-of-mass angular velocity, $\omega^{act}$ denotes an actual center-of-mass angular velocity, $R^{ref}$ denotes a reference rotation matrix of a center-of-mass coordinate system relative to a world coordinate system, $R^{act}$ denotes an actual rotation matrix of the center-of-mass coordinate system relative to the world coordinate system, $(R^{ref}R^{act})^v$ denotes a rotation vector from $R^{act}$ to $R^{ref}$, and $K_p^\omega$ and $K_d^\omega$ denote gain matrices associated with center-of-mass angular acceleration.

Step 728: The processor obtains the desired center-of-mass motion data according to the center-of-mass motion data adjustment value and the reference center-of-mass motion data.

In some embodiments, the desired center-of-mass motion data is calculated by adding the center-of-mass motion data adjustment value and the reference center-of-mass motion data. For example, when the reference center-of-mass motion data includes reference center-of-mass acceleration and reference center-of-mass angular acceleration and the center-of-mass motion data adjustment value includes a center-of-mass acceleration adjustment value and a center-of-mass angular acceleration adjustment value, the reference center-of-mass acceleration and the center-of-mass acceleration adjustment value are added to obtain desired center-of-mass acceleration, and the reference center-of-mass angular acceleration and the center-of-mass angular acceleration adjustment value are added to obtain desired center-of-mass angular acceleration. The desired center-of-mass motion data includes desired generalized center-of-mass acceleration, i.e., including the desired center-of-mass acceleration and the desired center-of-mass angular acceleration described above.

Step 730: The processor calculates, based on the desired center-of-mass motion data, the center-of-mass control information required to make the value of the objective function satisfy an optimization stop condition.

In some embodiments, the robot is simplified as a particle model, a corresponding kinetics equation may be obtained by performing kinetics analysis on the particle model, and then the kinetics equation is analyzed, so that the objective function can be constructed based on an objective of making the center-of-mass motion trajectory of the robot consistent with the center-of-mass reference trajectory. In some embodiments, a value of the objective function may be used for representing a degree of deviation of the robot from the center-of-mass reference trajectory. For example, the smaller the value of the objective function, the smaller the degree of deviation of the robot from the center-of-mass reference trajectory. Conversely, the greater the value of the objective function, the greater the degree of deviation of the robot from the center-of-mass reference trajectory. In this case, the optimization stop condition corresponding to the objective function may be to stop optimization when the value of the objective function is minimum. Certainly, in some other examples, the smaller the value of the objective function, the greater the degree of deviation of the robot from the center-of-mass reference trajectory. Conversely, the greater the value of the objective function, the smaller the degree of deviation of the robot from the center-of-mass reference trajectory. In this case, the optimization stop condition corresponding to the objective function may be to stop optimization when the value of the objective function is maximum. Therefore, the optimization stop condition corresponding to the objective function may be designed depending on a manner of constructing the objective function. Different manners of constructing the objective function may correspond to different optimization stop conditions. For example, the optimization stop condition corresponding to the objective function constructed in a manner A is to stop optimization when the value of the objective function is minimum. The optimization stop condition corresponding to the objective function constructed in a manner B is to stop optimization when the value of the objective function is maximum.

Parameters of the objective function include desired center-of-mass motion data and center-of-mass control information. The desired center-of-mass motion data may be calculated through step 720. The center-of-mass control information is an optimization variable. The center-of-mass control information when the value of the objective function satisfies the optimization stop condition may be obtained by optimizing the objective function. The center-of-mass control information obtained by optimization is used as the center-of-mass control information used for controlling the robot to follow the center-of-mass reference trajectory to move.

In an exemplary embodiment, the objective function is:

$$J_{qp}=(w^{des}-Af)^T W_w (w^{des}-Af);$$

where $W_w$ denotes a positive definite weight matrix, $w^{des}$ denotes the desired center-of-mass motion data, A denotes a matrix constructed based on a position relationship between the center of mass of the robot and contact points, and f denotes the center-of-mass control information. The above contact points are contact points between the robot and an environment, for example, contact points between the robot and the ground or another object in the environment. Contact between the robot and an object in the environment may generate force to cause the robot to execute the target motion.

In some embodiments, the robot may be simplified as a particle model, then kinetics analysis is performed on the particle model to construct a corresponding kinetics equation, and the objective function is constructed based on the kinetics equation. The kinetics equation is constructed based on force in all directions that the robot is subjected to. The force in all directions is superimposed on each other to keep the robot in a static or stable state. The objective function used for controlling the robot to follow the center-of-mass reference trajectory to move is constructed by simplifying the robot as the particle model and then performing kinetics analysis on the particle model, so that a process of constructing the objective function and a process of optimizing and analyzing the objective function can be simplified, so as to generate an objective function that is relatively simple and capable of achieving the objective, which helps to reduce an amount of calculation required by subsequent optimization of the objective function and improve efficiency of the entire robot control process.

In some embodiments, the center-of-mass control information required to make the value of the objective function satisfy an optimization stop condition is calculated by quadratic programming (QP) optimization or interior point optimizer (IPOPT) optimization. The QP optimization is a nonlinear optimization method, which is to find a multidimensional vector under linear constraints in essence, so as to minimize (or maximize) a quadratic objective function value of the multidimensional vector. In this embodiment of this disclosure, the center-of-mass control information is obtained by QP optimization, so that the robot can follow the given center-of-mass reference trajectory to execute the target motion. The IPOPT optimization is also a nonlinear optimization method. Certainly, in addition to the QP optimization or IPOPT optimization, other nonlinear optimization methods may also be adopted, which is not limited in this embodiment of this disclosure.

Step 740: The processor generates joint control information according to the center-of-mass control information and a structure matrix of the robot.

After the center-of-mass control information is generated by optimization, the joint control information used for controlling motion of joints of the robot may be generated by combining the structure matrix of the robot.

In an exemplary embodiment, considering that each joint of the robot may have a corresponding motion trajectory and maximum motion amplitude, in order to ensure that the joint of the robot moves according to the corresponding motion trajectory and may not exceed the corresponding maximum motion amplitude, as shown in FIG. 7, step 740 may include the following substeps (742 to 748):

Step 742: The processor generates intermediate joint control information according to the center-of-mass control information and the structure matrix of the robot.

The intermediate joint control information refers to joint control information directly generated based on the center-of-mass control information and the structure matrix of the robot. For example, the intermediate joint control information is obtained by directly multiplying the center-of-mass control information by the structure matrix of the robot. If the joints of the robot are controlled directly based on the intermediate joint control information, some joints may not move according to the corresponding motion trajectories or exceed the corresponding maximum motion amplitude. Therefore, in order to prevent the phenomenon, the intermediate joint control information further needs to be adjusted through the following steps.

Step 744: The processor obtains actual joint motion data of the robot.

The actual joint motion data is actual values of motion data associated with the joints of the robot. The actual joint motion data may be obtained by measuring actual joint states of the robot through a sensor or by other means. In some embodiments, the actual joint motion data includes, but is not limited to, at least one of the following: an actual joint angle, an actual joint angular velocity, and actual joint angular acceleration.

Step 746: The processor obtains reference joint motion data of the robot.

The reference joint motion data is reference values of the motion data associated with the joints of the robot. The reference joint motion data may be correspondingly calculated according to the center-of-mass reference trajectory. In some embodiments, the reference joint motion data includes, but is not limited to, at least one of the following: a reference joint angle, a reference joint angular velocity, and reference joint angular acceleration.

Step 744 and step 746 may be performed at the same time, step 744 may be performed before step 746, or step 744 may be performed after step 746, which is not limited in this embodiment of this disclosure.

Step 748: The processor adjusts the intermediate joint control information according to the actual joint motion data and the reference joint motion data to obtain the joint control information.

In some embodiments, an adjustment value corresponding to the intermediate joint control information is calculated according to the actual joint motion data and the reference joint motion data, and then the adjustment value is used to adjust the intermediate joint control information to obtain the joint control information.

For example, when the intermediate joint control information includes intermediate torque of the joints of the robot, adjustment values respectively corresponding to the intermediate torque of the joints are calculated according to the actual joint motion data (e.g., including an actual joint angle and an actual joint angular velocity) and the reference joint motion data (e.g., including a reference joint angle and a reference joint angular velocity), and then the intermediate torque of the joints is added to the corresponding adjustment values to obtain final torque applied to the joints.

In some embodiments, the adjusting the intermediate joint control information according to the actual joint motion data and the reference joint motion data to obtain the joint control information is obtained according to $\tau = -J_\tau^T f_{opt} + K_d^{\dot{q}}(\dot{q}^{ref} - \dot{q}^{act}) + K_p^q(q^{ref} - q^{act})$, where T denotes joint torque, $J_\tau$ denotes the structure matrix, $f_{opt}$ denotes the center-of-mass control information obtained by optimization, $\dot{q}^{ref}$ denotes a reference joint angular velocity, $\dot{q}^{act}$ denotes an actual joint angular velocity, $q^{ref}$ denotes a reference joint angle, $q^{act}$ denotes an actual joint angle, and $K_p^q$ and $K_d^q$ are gain matrices associated with the joint torque.

For any joint, a joint angle may refer to an angle between two parts connected by the joint. A joint angular velocity may refer to a variation of the joint angle per unit time, which is used for describing how fast the joint angle changes over time.

Step 750: The processor controls the robot to execute the target motion based on the joint control information.

After the joint control information (e.g., the torque of the joints) used for controlling the motion of the robot is obtained, the corresponding torque is applied to the joints of the robot through a drive motor to cause the robot to execute the target motion.

Based on the above, in the technical solution according to this embodiment of this disclosure, by constructing the objective function and using a nonlinear optimization method such as QP optimization or IPOPT optimization to optimize the objective function, the center-of-mass control information used for controlling the robot to follow the center-of-mass reference trajectory to move can be obtained efficiently and robustly.

In addition, the processor further determines the desired center-of-mass/joint motion data of the robot based on the actual center-of-mass/joint motion data and the reference center-of-mass/joint motion data of the robot, and then obtains the center-of-mass/joint control information based on the desired center-of-mass/joint motion data, which ensures that the center-of-mass/joint control information finally obtained can accurately control the robot to follow the center-of-mass reference trajectory to move, and can also be corrected in time and finally achieve an objective of accurately controlling the robot to execute the target motion even if a deviation occurs.

Besides, the processor further generates the intermediate joint control information according to the center-of-mass control information and the structure matrix of the robot, and then adjusts the intermediate joint control information according to the actual joint motion data and the reference joint motion data to obtain the joint control information finally controlling the motion of the joints of the robot, which can prevent the phenomenon that some joints may not move according to the corresponding motion trajectories or exceed the corresponding maximum motion amplitude, ensuring accuracy and effectiveness of the control over the motion of the joints.

In an embodiment, the processor first constructs an objective function. The objective function is optimized to obtain force used for controlling the motion of the robot, so that the center-of-mass motion trajectory of the robot is consistent with the center-of-mass reference trajectory. The objective function is optimized to obtain the force used for controlling the motion of the robot. Torque used for controlling the motion of the robot is determined based on the force used for controlling the motion of the robot.

Specifically, the processor performs kinetics analysis on a particle model obtained by simplification based on a robot body to obtain a kinetics equation; and analyzes the kinetics equation and constructs the objective function based on an objective of making the center-of-mass motion trajectory of the robot consistent with the center-of-mass reference trajectory.

Specifically, the processor simplifies the robot body as the particle model, obtains the corresponding kinetics equation by performing kinetics analysis on the particle model, and then analyzes the kinetics equation, so that the objective function can be constructed based on the objective of making the center-of-mass motion trajectory of the robot consistent with the center-of-mass reference trajectory. To enable the robot to execute the target motion according to the above center-of-mass reference trajectory, there is a need to use particle kinetics optimization control to optimize the objective function to obtain appropriate control information to follow the center-of-mass reference trajectory.

Further, the processor may determine the torque used for controlling the motion of the robot in the following manner: obtaining actual angles and actual angular velocities of the joints of the robot, obtaining reference angles and reference angular velocities of the joints based on the center-of-mass reference trajectory, and determining, based on the force used for controlling the motion of the robot, the actual angles and the actual angular velocities of the joints, and the reference angles and the reference angular velocities of the joints, the torque used for controlling the motion of the robot. For any joint of the robot, a joint angle may refer to an angle between two parts connected by the joint. A joint angular velocity may refer to a variation of the joint angle per unit time, which is used for describing how fast the joint angle changes over time.

For example, the processor controls the leg-wheel hybrid quadruped robot to execute a target motion from a four-legged lying down state to a two-legged (two-wheeled) standing state, the center-of-mass control information may include a bearing surface reaction force used for controlling the motion of the robot, and the joint control information may include joint torque applied to the joints of the robot. For any joint, the joint torque may refer to torque needing to be applied to the joint.

Figure 8:
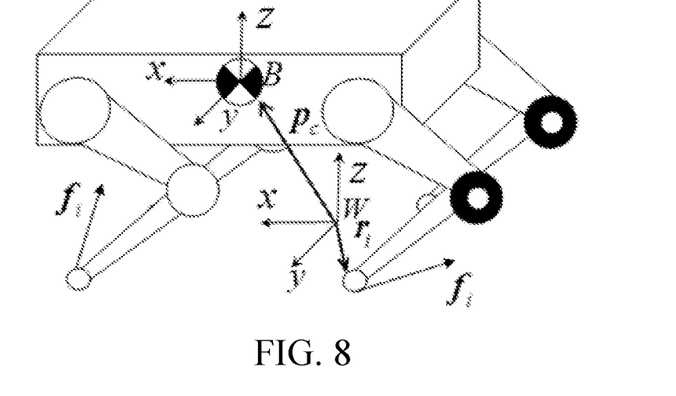
FIG. 8 is a schematic diagram of a particle model corresponding to a leg-wheel hybrid quadruped robot according to this disclosure.

Firstly, the processor simplifies the leg-wheel hybrid quadruped robot as a particle model shown in FIG. 8, and after kinetics analysis on the particle model, the following equation may be obtained:

$$\begin{bmatrix} m(\ddot{p}_c - g) \\ \dot{L} \end{bmatrix} = \sum_{i=1}^{N_c} \begin{bmatrix} I_{3\times 3} \\ \hat{r}_i - \hat{p}_c \end{bmatrix} f_i = Af \qquad \text{(Equation 1)}$$

where m denotes total mass of the robot, L denotes angular momentum, $p_c$ and $r_i$ respectively denote positions of a center of mass and contact points (e.g., contact points between legs of the robot and the ground) under the world coordinate system xWz, $f_i$ denotes bearing surface reaction force of the contact points, $N_C$ denotes a number of the contact points, denotes center-of-mass acceleration, g denotes gravitational acceleration, $\dot{L}$ denotes angular momentum differential, $\hat{p}_c$ and $\hat{r}_i$ respectively denote skew symmetric matrices corresponding to the positions of the center of mass and the contact points under the world coordinate system xWz, and $I_{3\times 3}$ denotes a unit matrix of 3×3.

A denotes a matrix constructed based on the position of the center of mass and the positions of the contact points, and A is in a form of:

$$A = \begin{bmatrix} I_{3\times 3} & I_{3\times 3} & \cdots & I_{3\times 3} \\ \hat{r}_1 - \hat{p}_c & \hat{r}_2 - \hat{p}_c & \cdots & \hat{r}_{N_C} - \hat{p}_c \end{bmatrix} \quad \text{(Equation 2)}$$

f denotes a matrix constructed based on the bearing surface reaction force of the contact points, and f is in a form of:

$$f = [f_1, f_2, \ldots, f_{N_C}]^T \quad \text{(Equation 3)}$$

If mass of the four legs of the robot is ignored, the angular momentum differential L corresponding to the center of mass may be expressed as:

$$\dot{L} \approx I\dot{\omega} + \omega \times (I\omega) \quad \text{(Equation 4)}$$

where I denotes instantaneous moment of inertia of the body, $\omega$ denotes the center-of-mass angular velocity, and $\dot{\omega}$ denotes the center-of-mass angular acceleration.

The objective function is constructed according to the above Equation 1, and is optimized to obtain the bearing surface reaction force used for controlling the motion of the robot, so that the center-of-mass motion trajectory of the robot is consistent with the center-of-mass reference trajectory. The objective function may be expressed as:

$$J_{qp} = (w^{des} - Af)^T W^w (w^{des} - Af) \quad \text{(Equation 5)}$$

where $W_w$ denotes a positive definite weight matrix, and $w^{des}$ denotes the desired value (i.e., the desired center-of-mass motion data), which is in a specific form of:

$$w^{des} = \begin{bmatrix} m(\ddot{p}_c^{des} - g) \\ \dot{L}^{des} \end{bmatrix} \quad \text{(Equation 6)}$$

Herein, $\ddot{p}_c^{des}$ denotes the desired center-of-mass acceleration, which is associated with the reference center-of-mass acceleration $\ddot{p}_c^{ref}$, the reference center-of-mass velocity $\dot{p}_c^{ref}$, and the reference center-of-mass position $p_c^{ref}$. The following PD controller is constructed. The desired center-of-mass acceleration $\ddot{p}_c^{des}$ is calculated by combining the actual center-of-mass velocity $\dot{p}_c^{act}$ and the actual center-of-mass position $p_c^{act}$:

$$\ddot{p}_c^{des} = \ddot{p}_c^{ref} + \ddot{p}_c^{adj} = \ddot{p}_c^{ref} + K_d^c(\dot{p}_c^{ref} - \dot{p}_c^{act}) + K_p^c(p_c^{ref} - p_c^{act}) \quad \text{(Equation 7)}$$

where $\ddot{p}_c^{adj}$ denotes the center-of-mass acceleration adjustment value, and $K_p^c$ and $K_d^c$ denote PD gain.

Referring to Equation 4, desired angular momentum differential $\dot{L}^{des}$ may be expressed as:

$$\dot{L}^{des} = I^{act} \dot{\omega}^{des} - (I^{act} \omega^{act}) \times \omega^{act} \quad \text{(Equation 8)}$$

where $I^{act}$ denotes actual instantaneous moment of inertia of the body, and $\omega^{act}$ denotes an actual center-of-mass angular velocity. Herein, $\dot{\omega}^{des}$ denotes desired center-of-mass angular acceleration, and the following PD controlled is constructed:

$$\dot{\omega}^{des} = \dot{\omega}^{ref} + \dot{\omega}^{adj} = \dot{\omega}^{ref} + K_d^{\omega}(\omega^{ref} - \omega^{act}) + K_p^{\omega}(R^{ref} R^{act})^v \quad \text{(Equation 9)}$$

where $\dot{\omega}^{adj}$ denotes the center-of-mass angular acceleration adjustment value, $R^{ref}$ and $R^{act}$ respectively denote reference and actual rotation matrices of a center-of-mass system relative to the world coordinate system, $(R^{ref} R^{act})^v$ denotes a rotation vector from $R^{act}$ to $R^{ref}$, $\omega^{act}$ denotes the actual center-of-mass angular velocity, $\omega^{ref}$ denotes the reference center-of-mass angular velocity, and $K_p^{\omega}$ and $K_d^{\omega}$ denote PD gain.

Then, Equation 5 is taken as the objective function and goes through QP optimization, and desired bearing surface reaction force can be obtained by optimization. Specifically, Equation 5 is simplified as a standard form of a QP optimization objective function, that is, $$J_{qp} = f^T(A^T W A)f - f^T(2A^T W w^{des}) + w^{des^T} W w^{des} \quad \text{(Equation 10)}$$

A Hessian matrix required by QP optimization is $(A^T W A)$, a gradient vector is $-A^T W w^{des}$, and a to-be-optimized variable is the bearing surface reaction force f. Then, the bearing surface reaction force can be obtained by QP optimization on a function library.

Finally, joint torque to achieve the motion of the center-of-mass reference trajectory can be obtained by using inverse joint kinetics:

$$\tau = -J_\tau^T f_{opt} + K_d^q(\dot{q}^{ref} - \dot{q}^{act}) + K_p^q(q^{ref} - q^{act}) \quad \text{(Equation 11)}$$

where $J_\tau$ denotes a joint Jacobian matrix, $f_{opt}$ denotes the bearing surface reaction force obtained by optimization, $\dot{q}^{ref}$ and $\dot{q}^{act}$ respectively denote the reference joint angular velocity and the actual joint angular velocity, $q^{ref}$ and $q^{act}$ respectively denote the reference joint angle and the actual joint angle, and $K_p^q$ and $K_d^q$ denote PD gain.

In the above embodiment, the robot is simplified as the particle model, the center-of-mass reference trajectory used for guiding the robot to execute the target motion is obtained, then force and torque for controlling the robot to follow the center-of-mass reference trajectory to move is generated by QP optimization, and the robot is controlled accordingly to execute the target motion. For a motion scenario where the position of the center of mass changes, accurate and effective control can be realized, so that the robot can complete the target motion as expected, enriching the robot's motion capability. Firstly, the center-of-mass reference trajectory is determined offline, then the controller is constructed to realize online following of the center-of-mass reference trajectory, and the actual center-of-mass motion trajectory is continuously fitted to the center-of-mass reference trajectory, so that a given target motion can be executed without a need to obtain accurate kinetics parameters and stable ground friction conditions. The whole solution has low sensitivity to the environment and has high robustness, effectively improving stability of controlling the robot to execute the target motion.

It is to be understood that, steps in flowcharts of the foregoing embodiments are displayed in sequence based on indication of arrows, but the steps are not necessarily performed in sequence based on a sequence indicated by the arrows. Unless otherwise explicitly specified in this specification, execution of the steps is not strictly limited, and the steps may be performed in other sequences. In addition, at least some steps in the foregoing embodiments may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

The following is an apparatus embodiment of this disclosure, which can be used to perform the method embodiments of this disclosure. For details not disclosed in the apparatus embodiments of this disclosure, refer to the method embodiments of this disclosure.

Figure 9:
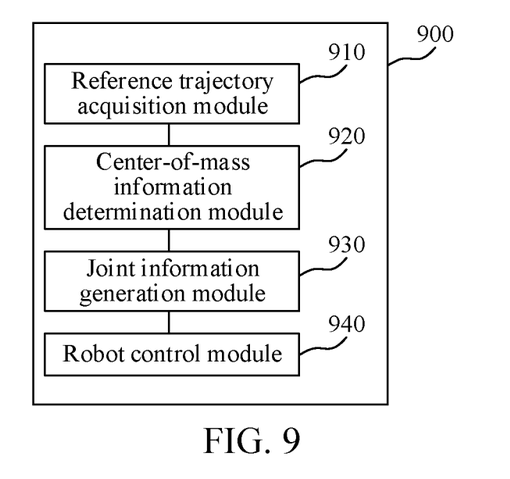
FIG. 9 is a block diagram of a robot motion control apparatus according to an embodiment of this disclosure.

Refer to FIG. 9 which shows a block diagram of a robot motion control apparatus according to an embodiment of this disclosure. The apparatus has functions of implementing the above robot motion control method. The functions may be implemented by hardware, or may be implemented by hardware executing corresponding software. The apparatus may be a robot or disposed in the robot. The apparatus 900 may include: a reference trajectory acquisition module 910, a center-of-mass information determination module 920, a joint information generation module 930, and a robot control module 940.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The reference trajectory acquisition module 910 is configured to obtain a center-of-mass reference trajectory used for guiding the robot to execute a target motion. The center-of-mass reference trajectory is a center-of-mass motion trajectory of the robot programmed to achieve the target motion.

The center-of-mass information determination module 920 is configured to obtain, based on optimization of an objective function, center-of-mass control information for controlling the robot to follow the center-of-mass reference trajectory to move.

The joint information generation module 930 is configured to generate joint control information according to the center-of-mass control information and a structure matrix of the robot.

The robot control module 940 is configured to control the robot to execute the target motion based on the joint control information.

In some embodiments, a value of the objective function is used for representing a degree of deviation of the robot from the center-of-mass reference trajectory.

In some embodiments, the center-of-mass information determination module 920 is configured to obtain desired center-of-mass motion data of the robot based on the center-of-mass reference trajectory, the desired center-of-mass motion data being a desired value of motion data associated with a center of mass of the robot; and calculate, based on the desired center-of-mass motion data, the center-of-mass control information required to make the value of the objective function satisfy an optimization stop condition.

In some embodiments, the objective function is:

$$J_{qp} = (w^{des} - Af)^T W_w (w^{des} - Af)$$

where $W_w$ denotes a positive definite weight matrix, $w^{des}$ denotes the desired center-of-mass motion data, A denotes a matrix constructed based on a position relationship between the center of mass of the robot and contact points, and f denotes the center-of-mass control information, the contact points being contact points between the robot and an environment.

In an exemplary embodiment, the calculating the center-of-mass control information required to make the value of the objective function satisfy an optimization stop condition is obtained by QP optimization or IPOPT optimization.

In some embodiments, the center-of-mass information determination module 920 is further configured to obtain actual center-of-mass motion data of the robot; obtain reference center-of-mass motion data of the robot according to the center-of-mass reference trajectory; obtain a center-of-mass motion data adjustment value according to a difference between the actual center-of-mass motion data and the reference center-of-mass motion data; and obtain the desired center-of-mass motion data according to the center-of-mass motion data adjustment value and the reference center-of-mass motion data.

In some embodiments, the center-of-mass information determination module 920 is further configured to calculate a difference between the actual center-of-mass motion data and the reference center-of-mass motion data; and obtain the center-of-mass motion data adjustment value according to a gain matrix and the difference.

In some embodiments, the obtaining a center-of-mass motion data adjustment value according to a difference between the actual center-of-mass motion data and the reference center-of-mass motion data is obtained according to $\ddot{p}_c^{adj} = K_d^c(\dot{p}_c^{ref} - \dot{p}_c^{act}) + K_p^c(p_c^{ref} - p_c^{act})$ and $\dot{\omega}^{adj} = K_d^\omega(\omega^{ref} - \omega^{act}) + K_p^\omega(R^{ref}R^{act})^v$, where $\ddot{p}_c^{adj}$ denotes a center-of-mass acceleration adjustment value, $\dot{p}_c^{ref}$ denotes a reference center-of-mass velocity, $\dot{p}_c^{act}$ denotes an actual center-of-mass velocity, $p_c^{ref}$ denotes a reference center-of-mass position, $p_c^{act}$ denotes an actual center-of-mass position, $K_d^c$ and $K_p^c$ denote gain matrices associated with a center-of-mass acceleration, $\dot{\omega}^{adj}$ denotes a center-of-mass angular acceleration adjustment value, $\omega^{ref}$ denotes a reference center-of-mass angular velocity, $\omega^{act}$ denotes an actual center-of-mass angular velocity, $R^{ref}$ denotes a reference rotation matrix of a center-of-mass coordinate system relative to a world coordinate system, $R^{act}$ denotes an actual rotation matrix of the center-of-mass coordinate system relative to the world coordinate system, $(R^{ref}R^{act})^v$ denotes a rotation vector from $R^{act}$ to $R^{ref}$, and $K_p^\omega$ and $K_d^\omega$ denote gain matrices associated with center-of-mass angular acceleration.

In some embodiments, the robot motion control apparatus further includes an objective function construction module configured to perform kinetics analysis on a particle model obtained by simplification based on a robot body to obtain a kinetics equation; and analyze the kinetics equation and construct the objective function based on an objective of making the center-of-mass motion trajectory of the robot consistent with the center-of-mass reference trajectory.

In some embodiments, the joint information generation module 930 is further configured to generate intermediate joint control information according to the center-of-mass control information and the structure matrix of the robot; obtain actual joint motion data of the robot; obtain reference joint motion data of the robot; and adjust the intermediate joint control information according to the actual joint motion data and the reference joint motion data to obtain the joint control information.

In some embodiments, the adjusting the intermediate joint control information according to the actual joint motion data and the reference joint motion data to obtain the joint control information is obtained according to $\tau = -J_\tau^T f_{opt} + K_d^q(\dot{q}^{ref} - \dot{q}^{act}) + K_p^q(q^{ref} - q^{act})$, where $\tau$ denotes joint torque, $J_\tau$ denotes the structure matrix, $f_{opt}$ denotes the center-of-mass control information obtained by optimization, $\dot{q}^{ref}$ denotes a reference joint angular velocity, $\dot{q}^{act}$ denotes an actual joint angular velocity, $q^{ref}$ denotes a reference joint angle, $q^{act}$ denotes an actual joint angle, and $K_p^q$ and $K_d^q$ are gain matrices associated with the joint torque.

In some embodiments, the robot is a quadruped robot, and the target motion is a motion process from a four-legged lying down state to a two-legged standing state.

It should be noted that, when the apparatus implements functions, the foregoing embodiment is merely described by using an example of dividing various functional modules. In actual application, the foregoing function allocation is completed by different functional modules according to needs, that is, the internal structure of the device is divided into different functional modules, to complete all or some of functions described above. The modules in the foregoing apparatus may be implemented entirely or partially by software, hardware, or a combination thereof. The foregoing modules may be built in or independent of a processor of a robot in a hardware form, or may be stored in a memory of the robot in a software form, so that the processor invokes and performs an operation corresponding to each of the foregoing modules. In addition, the apparatus and method embodiments provided in the foregoing embodiments belong to the same conception. For the specific implementation process, reference may be made to the method embodiments.

Figure 10:
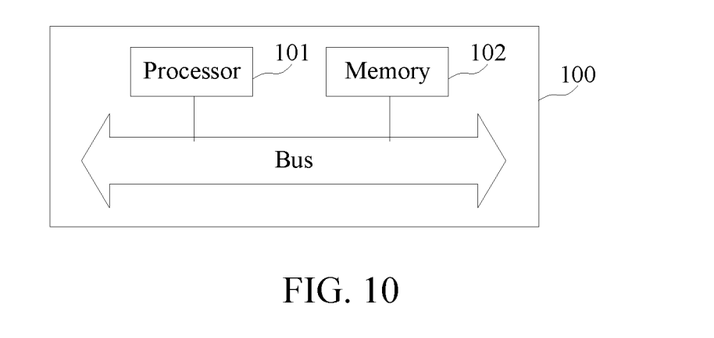
FIG. 10 is a block diagram of a simplified structure of a robot according to an embodiment of this disclosure.

Refer to FIG. 10 which shows a block diagram of a simplified structure of a robot according to an embodiment of this disclosure. The robot may be a biped robot, a quadruped robot, or the like, which is not limited in this embodiment of this disclosure.

As shown in FIG. 10, the robot 100 includes one or more processors 101 and a memory 102. The one or more processors 101 include, but are not limited to, any one of the following: a processing unit (CPU), a graphics processing unit (GPU), and a field programmable gate array (FPGA). The memory 102 may include a memory device such as a random-access memory (RAM) and a read-only memory (ROM). The processor 101 and the memory 102 may be connected by using a system bus.

In an exemplary embodiment, the memory 102 stores at least one instruction, at least one program, and a code set or an instruction set, and the at least one instruction, the at least one program, and the code set or the instruction set is loaded and executed by the processor 71 to implement the robot motion control method in the foregoing embodiments.

In an exemplary embodiment, one or more non-transitory computer-readable storage media storing computer-readable instructions are further provided, the storage medium storing at least one instruction, at least one program, a code set or an instruction set, and the at least one instruction, the at least one program, the code set or the instruction set being executed by the processor of a computer device to implement the foregoing robot motion control method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of the robot reads the computer instructions from the computer-readable storage medium and executes the computer instructions to cause the robot to perform the robot motion control method.

It is to be understood that "plurality of" mentioned in this specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely schematically show an exemplary execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A robot motion control method, applied to a robot, the method comprising:
    obtaining a center-of-mass reference trajectory for guiding the robot to execute a target motion; the center-of-mass reference trajectory being a center-of-mass motion trajectory of the robot configured to achieve the target motion;
    determining desired center-of-mass motion data of the robot based on the center-of-mass reference trajectory, the desired center-of-mass motion data being a desired value of motion data associated with a center of mass of the robot;
    constructing an objective function based on the desired center-of-mass motion data and matrix data constructed based on a position relationship between the center of mass of the robot and contact points, the contact points being contact points between the robot and an environment, a value of the objective function is representing a degree of deviation of the robot from the center-of-mass reference trajectory, wherein the objective function is:

$$J_{qp} = (w^{des} - Af)^T W_w (w^{des} - Af),$$

where $W_w$ denotes a positive definite weight matrix, $w^{des}$ denotes the desired center-of-mass motion data, A denotes the matrix and f denotes the center-of-mass control information;
    calculating center-of-mass control information enabling the value of the objective function to satisfy an optimization stop condition;
    generating joint control information according to the center-of-mass control information and a structure matrix of the robot; and
    controlling the robot to execute the target motion based on the joint control information.

2. The method according to claim 1, wherein the calculating the center-of-mass control information comprises:
    utilizing quadratic programming (QP) optimization to calculate the center-of-mass control information.

3. The method according to claim 1, wherein the calculating the center-of-mass control information comprises:
    utilizing interior point optimizer (IPOPT) optimization to calculate the center-of-mass control information.

4. The method according to claim 1, wherein the obtaining the desired center-of-mass motion data of the robot based on the center-of-mass reference trajectory comprises:
    obtaining actual center-of-mass motion data of the robot;

obtaining reference center-of-mass motion data of the robot according to the center-of-mass reference trajectory;

obtaining a center-of-mass motion data adjustment value according to a difference between the actual center-of-mass motion data and the reference center-of-mass motion data; and obtaining the desired center-of-mass motion data according to the center-of-mass motion data adjustment value and the reference center-of-mass motion data.

5. The method according to claim 4, wherein the obtaining the center-of-mass motion data adjustment value according to the difference between the actual center-of-mass motion data and the reference center-of-mass motion data comprises:

calculating a difference between the actual center-of-mass motion data and the reference center-of-mass motion data; and obtaining the center-of-mass motion data adjustment value according to a gain matrix and the difference, the gain matrix corresponding to the motion data associated with the center of mass of the robot.

6. The method according to claim 4, wherein the center-of-mass motion data adjustment value comprises a center-of-mass acceleration adjustment value and a center-of-mass angular acceleration adjustment value.

7. The method according to claim 6, wherein the center-of-mass acceleration adjustment value is represented by $\ddot{p}_c^{adj}=K_d^c(\dot{p}_c^{ref}-\dot{p}_c^{act})+K_p^c(p_c^{ref}-p_c^{act})$, where $\ddot{p}_c^{adj}$ denotes a center-of-mass acceleration adjustment value, $\dot{p}_c^{ref}$ denotes a reference center-of-mass velocity, $\dot{p}_c^{act}$ denotes an actual center-of-mass velocity, $p_c^{ref}$ denotes a reference center-of-mass position, $p_c^{act}$ denotes an actual center-of-mass position, $K_d^c$ and $K_p^c$ denote gain matrices associated with center-of-mass acceleration.

8. The method according to claim 6, wherein the center-of-mass angular acceleration adjustment value is represented by $\omega_{adj}=K_d^\omega(\omega^{ref}-\omega^{act})+K_p^\omega(R^{ref}R^{act})_V$, where $\omega^{adj}$ denotes a center-of-mass angular acceleration adjustment value, $\omega^{ref}$ denotes a reference center-of-mass angular velocity, $\omega^{act}$ denotes an actual center-of-mass angular velocity, $R^{ref}$ denotes a reference rotation matrix of a center-of-mass coordinate system relative to a world coordinate system, $R^{act}$ denotes an actual rotation matrix of the center-of-mass coordinate system relative to the world coordinate system, $(R^{ref}R^{act})^V$ denotes a rotation vector from $R^{act}$ to $R^{ref}$, and $K_p^\omega$ and $K_d^\omega$ denote gain matrices associated with center-of-mass angular acceleration.

9. The method according to claim 1, wherein the method further comprises:

performing kinetics analysis on a particle model to obtain a kinetics equation, the particle model being obtained by simplification based on a robot body; and analyzing the kinetics equation and constructing the objective function based on an objective of making the center-of-mass motion trajectory of the robot consistent with the center-of-mass reference trajectory.

10. The method according to claim 1, wherein the generating the joint control information according to the center-of-mass control information and the structure matrix of the robot comprises:

generating intermediate joint control information according to the center-of-mass control information and the structure matrix corresponding to the robot;

obtaining actual joint motion data of the robot;

obtaining reference joint motion data of the robot; and adjusting the intermediate joint control information according to the actual joint motion data and the reference joint motion data to obtain the joint control information.

11. The method according to claim 10, wherein the joint control information comprises joint torque represented by $\tau=-J_\tau^T f_{opt}+K_d^q(\dot{q}^{ref}-\dot{q}^{act})+K_p^q(q^{ref}-q^{act})$, where $\tau$ denotes joint torque, $J_\tau$ denotes the structure matrix corresponding to the robot, $f_{opt}$ denotes the center-of-mass control information obtained by optimization, $\dot{q}^{ref}$ denotes a reference joint angular velocity, $\dot{q}^{act}$ denotes an actual joint angular velocity, $q^{ref}$ denotes a reference joint angle, $q^{act}$ denotes an actual joint angle, and $K_p^q$ and $K_d^q$ are gain matrices associated with the joint torque.

12. The method according to claim 11, wherein the robot is a quadruped robot, and the target motion is a motion process from a four-legged lying down state to a two-legged standing state.

13. A robot motion control apparatus, comprising:

a memory operable to store computer-readable instructions; and a processor circuitry operable to read the computer-readable instructions, the processor circuitry when executing the computer-readable instructions is configured to:

obtain a center-of-mass reference trajectory for guiding the robot to execute a target motion; the center-of-mass reference trajectory being a center-of-mass motion trajectory of the robot configured to achieve the target motion;

determine desired center-of-mass motion data of the robot based on the center-of-mass reference trajectory, the desired center-of-mass motion data being a desired value of motion data associated with a center of mass of the robot;

construct an objective function based on the desired center-of-mass motion data and matrix data constructed based on a position relationship between the center of mass of the robot and contact points, the contact points being contact points between the robot and an environment, a value of the objective function is representing a degree of deviation of the robot from the center-of-mass reference trajectory;

wherein the objective function is:

$$J_{qP}=(w^{des}-Af)^T W_w(w^{des}-Af),$$

where $W_w$ denotes a positive definite weight matrix, $w^{des}$ denotes the desired center-of-mass motion data, A denotes the matrix and f denotes the center-of-mass control information;

calculate center-of-mass control information enabling the value of the objective function to satisfy an optimization stop condition;

generate joint control information according to the center-of-mass control information and a structure matrix of the robot; and control the robot to execute the target motion based on the joint control information.

14. The apparatus according to claim 13, wherein the processor circuitry is configured to:

obtain actual center-of-mass motion data of the robot;

obtain reference center-of-mass motion data of the robot according to the center-of-mass reference trajectory;

obtain a center-of-mass motion data adjustment value according to a difference between the actual center-of-mass motion data and the reference center-of-mass motion data; and obtain the desired center-of-mass motion data according to the center-of-mass motion data adjustment value and the reference center-of-mass motion data.

15. The apparatus according to claim 13, wherein the processor circuitry is further configured to:
    perform kinetics analysis on a particle model to obtain a kinetics equation, the particle model being obtained by simplification based on a robot body; and
    analyze the kinetics equation and construct the objective function based on an objective of making the center-of-mass motion trajectory of the robot consistent with the center-of-mass reference trajectory.

16. The apparatus according to claim 13, wherein the processor circuitry is configured to:
    generate intermediate joint control information according to the center-of-mass control information and the structure matrix corresponding to the robot;
    obtain actual joint motion data of the robot;
    obtain reference joint motion data of the robot; and
    adjust the intermediate joint control information according to the actual joint motion data and the reference joint motion data to obtain the joint control information.

17. A non-transitory machine-readable media, having instructions stored on the machine-readable media, the instructions configured to, when executed, cause a machine to:
    obtain a center-of-mass reference trajectory for guiding the robot to execute a target motion; the center-of-mass reference trajectory being a center-of-mass motion trajectory of the robot configured to achieve the target motion;
    determine desired center-of-mass motion data of the robot based on the center-of-mass reference trajectory, the desired center-of-mass motion data being a desired value of motion data associated with a center of mass of the robot;
    construct an objective function based on the desired center-of-mass motion data and matrix data constructed based on a position relationship between the center of mass of the robot and contact points, the contact points being contact points between the robot and an environment, a value of the objective function is representing a degree of deviation of the robot from the center-of-mass reference trajectory, wherein the objective function is:

$$J_{qp} = (w^{des} - Af)^T W_w (w^{des} - Af),$$

where $W_w$ denotes a positive definite weight matrix, $w^{des}$ denotes the desired center-of-mass motion data, A denotes the matrix and f denotes the center-of-mass control information;
    calculate center-of-mass control information enabling the value of the objective function to satisfy an optimization stop condition;
    generate joint control information according to the center-of-mass control information and a structure matrix of the robot; and
    control the robot to execute the target motion based on the joint control information.

* * * * *

UNITED STATES PATENT AND TRADEMARK OFFICE
CERTIFICATE OF CORRECTION

PATENT NO. : 12,330,309 B2
APPLICATION NO. : 17/983553
DATED : June 17, 2025
INVENTOR(S) : Qinqin Zhou et al.

Page 1 of 1

It is certified that error appears in the above-identified patent and that said Letters Patent is hereby corrected as shown below:

In the Claims

Column 21, Claim 8, Line 39, delete "$\dot{\omega}_{adj} = K_d^{\omega}(\omega^{ref} - \omega^{act}) + K_p^{\omega}(R^{ref}R^{act})_v$," and replace with --$\dot{\omega}^{adj} = K_d^{\omega}(\omega^{ref} - \omega^{act}) + K_p^{\omega}(R^{ref}R^{act})^v$,--.

Signed and Sealed this
Thirtieth Day of September, 2025

John A. Squires
*Director of the United States Patent and Trademark Office*